Patented Nov. 15, 1938

2,137,027

UNITED STATES PATENT OFFICE 2,137,027

METHOD OF PREPARING BREAD CONDITIONERS

Alfred Pollak, Woodmere, N. Y.

No Drawing. Application February 24, 1936,
Serial No. 65,429

5 Claims. (Cl. 99—91)

This invention relates to new and useful improvements in the art of making leavened dough products, such as for inst. bread.

More particularly, the invention relates to a method of preparing an improved dough conditioner. In the following, I will describe both my new method of preparing the conditioner and the reactions and results produced by it in the dough. In order that my invention may be fully understood, various matters will be described, even though the same may well be known in the art of bread making.

Bread should be "light" in relation to its volume. In order to produce this "lightness", yeast is commonly added to the dough. Thus, the "lightness" of the bread and its excellence in quality depend to a large extent upon the activity of the yeast or other ferment used, but other factors such as e. g. the quality of the flour assume equally great importance as will be shown in the following.

Due to differences in the constitution and strength of the ferment, due to variations in the type and quality of the flour and finally, due to different methods of preparing and baking the dough, it has been impossible to standardize successfully e. g. the manufacture of bread products, so as to obtain the best possible results.

On the contrary, it has been necessary heretofore to experiment with the dough and to add various agents and ingredients in order to make up for the deficiencies caused by these varying conditions. Such experimentation, particularly in the manufacture on a large scale, is costly and uneconomical both from the point of view of the materials wasted and the amount of time consumed. Moreover, in order to experiment successfully, the baker must be highly skilled; but even then a certain risk remains that the final product may lack in flavor, taste or appearance.

It is an object of this invention to overcome all these difficulties and to place in the hands of the trade a universal conditioner, i. e., a finished product which is simply incorporated in the dough and which may be used under any and every condition, but which, nevertheless, will produce a final product of uniformly high standard.

I accomplish these results by means of a new combination of ingredients as described in the following specification. Preferably, I combine the various ingredients to form a universal conditioner; however, the ingredients may also be added to the dough individually. Thus, the present invention also relates to a new method of preparing and treating the dough.

It is of course common knowledge that yeast is added to the dough in order to produce fermentation, which in turn causes the dough to rise. A prerequisite of fermentation is the presence of sugar.

As the art of making bread has been practiced heretofore, fermentation started immediately upon the discharge of a batch of dough from the mixers and continued until by far the greater portion of the amount of sugar available for the nutrition, propagation and stimulation of the yeast has been consumed. As soon as this state of exhaustion approaches, the fermentation becomes increasingly sluggish—often to the point of a complete standstill—and that, even before the dough has reached the oven or the end of the proofing stage. The lack of a prolonged fermentation makes itself felt particularly in the case where enzyme activation is resorted to by the addition of monocalcium phosphate for inst., or other acid containing yeast foods which tend to increase the initial acidity of the dough. As a result of such high acidity, the vital sugar is consumed before the dough reaches maturity. Thus, the desirable good qualities inherent in the dough are never fully developed and utilized.

I have made a great number of experiments and have discovered that it is not only desirable to prolong fermentation, but in order that the very best results be obtained it is necessary to maintain fermentation until the dough is placed in the oven and the gluten and the starch-gels become solidified under the influence of heat. In other words, the dough should be maintained in raised condition until the structure of the loaf becomes more or less rigid. Thus, the danger of a loaf of bread collapsing after it is placed in the oven is overcome.

I have found a new process of prolonging fermentation which consists in gradually supplying the required amounts of sugars to the dough throughout the entire fermentation, and I accomplish this result, preferably, by gradually releasing in the dough, during fermentation, acids, and preferably organic acids. These organic acids increase the hydrogen-ion concentration of the dough and stimulate the activity of the enzymes of the yeast as well as the diastatic enzymes of the flour. As a result of this increased enzymatic activity, an increased conversion of amylaceous carbohydrates through amylodiastases takes place, producing an increased supply of fermentable sugars, whereupon, due to zymase, cleavage of the sugars into carbonic acid and alcohol sets in. At the beginning of the operation there is a sufficient amount of such carbohydrate material present in the flour as will form a ready substrate for the action of the saccharogenic amylase. But this condition changes while fermentation proceeds and in order to prolong the latter it beomes necessary to stimulate the enzymes especially towards the end of the fermentation period. This is effected, in accordance with the present invention, by means of organic acids which are liberated successively during fermentation. New sugar is thus supplied continuously during fermentation in an entirely novel way.

The great advantage of this arrangement resides in the fact that sugar is gradually supplied to the enzymes up to the very end of fermentation which is thus considerably prolonged. In other words, the resistance of the yeast against heat is thus increased and the fermentation tolerance greatly improved. Moreover, the organic acids thus introduced have a direct and favorable influence upon the development of the aroma and flavor of the bread as will be more fully explained hereafter.

I found further that, on the one hand, it is desirable that at the beginning of the process the dough be sufficiently acid because the acidity of the dough serves the purpose of hydrating, i. e. maturing the gluten, and upon the degree of hydration depends, as is well known, the water imbibing and the water retaining property of the dough as well as its workability.

On the other hand, however, excessive initial acidity has the disadvantage of impairing the $CO_2$-gas retaining power of the dough, as will be readily understood by those skilled in the art.

In order to obtain an optimum degree of the gas retaining power of the dough, the pH of the dough should be higher or at any rate not lower, than the isoelectric point of the gluten.

I have discovered that I can satisfy these apparently contradictory requirements by buffering the dough. By the incorporation of a buffering substance in the dough the acidity of the dough is controlled whereby, due to the presence of the acids, the gluten is sufficiently hydrated and matured. On the other hand, the buffer keeps a permanent check on the acidity, so that the latter will not adversely affect the gluten and impair the carbon dioxide gas retaining properties of the dough.

Various buffering substances may be used for this purpose, however, I prefer to use a substance which will not only act as a buffer at the beginning of fermentation, but which will also regulate the acidity of the dough in a favorable way towards the end of the fermentation, while serving as a yeast nutrient at the same time. Such substances are for inst. fully or partly neutralized acid compounds, as e. g. the following: lactic acid or its mixtures with acetic acid as are formed in the sour dough fermentation; or organic phosphoric acid compounds such as phytin and phytic acids found in abundance in the steep water from starch factories, cornstarch factories, or in the spent wash from distilleries; further press water from the manufacture of potato products; or autolized yeast and yeast derivatives etc.

These acids are also found in infusions made from various plant products such as malt sprouts, grain germs, cotton oil seeds, soya beans, soya malt dispersions, etc. Likewise, amino-acids or inorganic salts such as e. g. phosphates may be used either singly or in combination with each other. The infusions mentioned may be made expressly for the process of the present invention or the waste from various industrial processing operations may be used for this purpose. Ammonium phosphates may also be used, although better results have been obtained with other substances. As already mentioned, these acids are preferably neutralized either fully or in part.

A special feature of the invention resides in the fact that the buffering substances above enumerated may be so constituted that they will gradually liberate acids during fermentation. This result is accomplished by the use of special neutralizing agents. In accordance with the present invention the acid materials which are intended to serve as buffers, are neutralized by means of a nitrogen containing agent, such as for instance ammonium carbonate $(NH_4)_2CO_3$. As a result, during the latter part of fermentation, after the more readily available ingredients have been assimilated, the nitrogen contained in the neutralizing agent added will be gradually absorbed by the yeast whereby acids are gradually liberated which in turn stimulate the formation of the vital sugar as hereinbefore explained. In other words, for the purpose of gradually releasing acids in the dough, a yeast food is incorporated in the buffering substance which is slowly and gradually assimilated by the yeast particularly during the latter part of fermentation, whereby the acids necessary for the stimulation of the starch-liquefying and saccharifying enzymes are released. The following substances have been found to be particularly adapted for neutralizing the acid bodies for the purposes explained herein: nitrogen containing alkalies, or compounds, such as ammonia, its carbonates and carbamates, urea and its combinations; furthermore alkalies and earth alkalies such as calcium or magnesium or both, either in the form of oxides, or hydroxides or carbonates; or salts of weak organic acids.

In this way the enzymes are stimulated even after the common foods and stimulants contained in the dough have been exhausted. Ordinarily, after the common yeast foods are exhausted, fermentation almost comes to a standstill. In the present invention, after exhaustion of the common yeast foods, fermentation continues due to the fresh supply of stimulants added to the dough.

I have also found that the duration of fermentation may be further prolonged by adding to the dough ammonium chloride. Ammonium chloride is generally considered a yeast food, but the use of ammonium chloride in the preparation of dough, in conjunction with the neutralized buffering substances hereinbefore mentioned, produces an entirely new result, namely: increased starch liquefaction. Ammonium chloride vigorously stimulates the action of the starch liquefying diastases, thereby assisting in the production of maltose by the saccharogenic enzymes in such amounts as are required for the highest efficacy of the bread conditioner according to the present invention.

Another outstanding feature of the present invention is the addition to the dough of phytin, phytin derivatives, or phytin containing substances. After many experiments I discovered that I can improve the dough by incorporating therein phytin either in its pure state or as an ingredient of other substances. Due to the presence of phytin the development of the sugar cleaving enzymes in the yeast, such as maltase and invertase, is accelerated far beyond the formation of proteolytic enzymes. As a result the fermentation will be strong and fast and of long duration even at raised temperatures. Fermentation will be further strengthened and prolonged by incorporating in the dough the mineral substances which are associated with the phytin. As stated before, pure phytin or its derivatives may be used for this purpose. But I have found that e. g. steepwater and waste from distilleries usually contain abundant supplies of phytin. Thus, when selecting a buffer for the process of the present invention a substance should be chosen which already contains phytin (cf. page 2 supra).

In thus treating the dough, the yeast contained therein is simultaneously improved. Thus, even if weak, stale or inferior yeast be used, the dough will not be affected thereby, because the bread conditioner of the present invention will make up the deficiencies of the yeast. In other words, the yeast is processed again and the work commenced in the yeast factory is finished, so to speak, in the bake shop.

The aroma and flavor of the bread, it has been found, will be greatly improved by adding to the dough organic acids, particularly amino acids. Inasmuch as organic acid complexes are preferably used in the present invention for both buffering and stimulating the dough as hereinbefore described, this fact should be borne in mind when selecting a buffering substance and an acid should be used which will also improve the flavor of the final product.

In the manufacture of bread the baker generally uses in addition to the flour, milk, sugar, etc., certain compounds such as for inst. sprouted malt for improving the quality of the dough. A special feature of the present invention is the combination of these additional compounds with the universal conditioner hereinbefore described. In the following these additional compounds will be termed "fillers". The fillers and the universal conditioner may be combined by simply mixing the fillers with either the dry or liquid conditioner.

Suitable diastatic fillers are for inst. malt or the malt extracts of various grains or seeds. Likewise, starch and flour products, which have a favorable influence upon the water distribution in the bread and are now much in use, may be combined effectively with the universal conditioner of the present invention. Equally suitable for this purpose are e. g. fillers high in protein content, such as dry milk powder, soya bean products, etc.; further, sugars, salt and salt mixtures. It will be obvious that the universal conditioner may equally well be incorporated in the flour from which the dough is prepared. Or even all the ingredients necessary for making bread, except yeast, may be mixed with my new universal conditioner, which would relieve the baker of a great part of his work.

Moreover, great advantages flow from the combination of the universal conditioner with the fillers above described. I have found that my universal conditioner favorably affects the fillers whose quality is thus greatly improved.

I discovered that the efficacy of these fillers may be further raised by pre-treating the same by means of my conditioner. Thus, the fillers may be simply mixed with my liquid conditioner and subjected to a heat treatment before admixture to the dough. Or, the fillers may be mixed with my liquid conditioner, subjected to a heat treatment, and thereafter dried. The dried mixture of the fillers and the conditioner are thereupon incorporated in the dough in the customary manner by means of mixing devices or otherwise.

An example of pre-treating a filler such as sprouted malt (malt flour) is given in the following:

The sprouted barley is first mixed with the neutralized acids, the amino-acids, the phytins, the mineral matter and the ammonium chloride i. e. the liquid part of the universal conditioner according to the present invention, and this mixture is held at an optimum temperature at which partial solubilization and saccharification takes place without damage to the enzymes. By this treatment and admixture the enzymes are stimulated, and are able to act much more vigorously in the final bread conditioner. A temperature of about 60° C.–50° C., is deemed favorable in this case, but a lower or higher temperature may be used, if other factors such as the acidity or time of treatment are changed.

The various specific features recited in the foregoing, aptly illustrate the interrelation of the reactions involved, to wit: The modified steepwater buffers the dough; gradually liberates, during fermentation, organic acids which stimulate the enzymes of the yeast as well as of the dough and thereby increase their activity; this increased enzymatic activity increases the production of liquefied non-sugar carbohydrates; the saccharogenic enzymes have thus sufficient raw material available, throughout the fermenting period, to produce such an amount of fermentable sugar as will maintain an adequate fermentation until after the dough has passed into the oven. Finally, this increased enzymic activity and the stimulation of the yeast resulting therefrom improve the quality of the bread generally; the aroma and flavor of the bread being also improved by the introduction of amino acids as hereinbefore described.

From the foregoing it will be clear that the interrelation of the various ingredients and steps is of greatest importance. And it is an outstanding feature of the present invention that at every stage, the vital physico-chemical and biochemical reactions which underlie the conditioning and baking process of yeast doughs, are brought into coordinated, sustained, and synchronized relation to each other, to the end that the quality of the bread, resulting therefrom, may be measurably raised above that now commonly obtained.

Referring to the interaction of the various ingredients used both in the preparation of the conditioner and the dough, it will be obvious that in my improved process, one reaction does not distinctly follow another, as no sharp line of demarcation exists, rather, it is characteristic of my invention and a valuable feature, purposely designed, that most of these reactions are closely related to and highly interdependent upon one another.

It should be noted particularly that the incorporation in the dough of the various ingredients of the present invention does not simply improve the dough to the extent of the sum of improvements which each individual ingredient would produce. On the contrary, the various ingredients mutually affect one another as well as the ingredients of the dough whereby a much better and more intensified reaction is produced.

In the foregoing I have described the principles upon which my new method of conditioning yeast doughs is based and it may be carried into industrial practice by following said description. A more convenient form is to prepare the complete compound, in dry or liquid form, for the baker, so that he may use it in much the same fashion as he uses flour, sugar and other standard ingredients of a dough batch, namely by commingling it with these other ingredients in a "mixer" and thereby effect its incorporation as an integral part of the dough. In all other ways he will follow the regular customs in vogue wherever leavened bread is produced on a commercial scale.

An illustrative example of carrying out the present invention is given in the following:

A buffering substance is added to the dough for the purposes described. The buffering substance may for inst. be steepwater and the same should be modified before its incorporation in the dough. Steepwater which is of widely varying constitution may contain ingredients in the following proportion calculated on the basis of dry substances.

|  | Percent |
| --- | --- |
| Nitrogen-containing substances, including amino-acids (calculated as N x 6.25) | 40–50 |
| Carbohydrates | 11–15 |
| Total acids (calculated as lactic acid) of which about 50% are lactic acid | 12–17 |
| Mineral matter | 15–18 |
| Which include: |  |
| $P_2O_5$ | 6–9 |
| CaO | 0.3–0.6 |
| MgO | 2–3 |
| $K_2O$ | 4–6 |

The steepwater concentrate may e. g. be partly neutralized by means of a nitrogen containing alkaline substance, or by means of a concentrated solution of urea in molecular proportion to the nitrogen containing alkali. In addition, ammonium chloride should be incorporated in the formula for the steepwater complex in a quantity which may range from .225 parts by weight to 2.0 parts by weight to 100 parts of the steepwater complex. Thereafter the filler substances mentioned in the foregoing may be added, as for example, sprouted barley, edible dextrine and soya bean meal. This combination is then added to the dough batch so that the steepwater concentrate will be present at the rate of ¼ of 1 percent, more or less, based on the weight of flour, as the case may require. In some cases it may be advisable to first dry the conditioner and pretreat the diastatic fillers as before described. These substances may also be added individually directly to the water or milk that is used in the manufacture of yeast-leavened products. A good working formula is the following:

|  | Percent |
| --- | --- |
| Steepwater modified in accordance with the present invention | 25 |
| Edible dextrine | 25 |
| Sprouted barley | 25 |
| Soya bean meal | 25 |

This combination is then added to the dough at the rate of 1 percent to the weight of flour. A conditioned dough may thus e. g. be prepared in the following way:

|  | Lb. |
| --- | --- |
| Formula: |  |
| Flour | 100 |
| Water (variable) | 65 |
| Salt (table salt) | 2 |
| Conditioner (including fillers) | 1 |
| Sugar | 4 |
| Dry milk (variable) | 6 |
| Yeast | 1½ |
| Shortening | 4 |

Any well known method of preparing the dough may be used in connection with my broad conditioner, such as for example the following:

Dissolve the yeast in a small portion of the water.

Put the remaining water, salt, bread conditioner, sugar, dry milk and shortening into the mixer and stir to dissolve the soluble materials. Add the flour, begin mixing, then add the yeast and continue mixing until a homogeneous dough has been obtained. In practice, the mixing time varies with the speed of the mixer employed in the bakery. It may run from six minutes to fifteen minutes, the mixing period being shorter when a high speed mixer is used while the mixing period is longer when the so-called "slow speed machine" is used. After the dough has been mixed, deposit it into a fermenting trough and ferment according to the practice of the bakery.

The sponge method may also be used in making doughs. In this case the steepwater concentrate may be added directly to the sponge or to the dough while the same is being mixed.

The following is an example of a formula for preparing a liquid bread conditioner:

|  | Percent |
| --- | --- |
| Vegetable concentrate, neutralized and ammonium chloride added | 25 |
| Diastatic malt extract | 75 |

This mixture may be used liquid e. g. as a syrup, or it may be dried by any known drying process.

In this connection it may be added, that the concentrate of vegetable origin which contains such biochemically important constituents as organic acids, amino acids, phytins, mineral matter, and all the added nitrogen-containing parts may be mixed with the malt extract during the processing of the latter as before described. This means that the vegetable compound may be introduced in the mash tub in which the malt is mashed; or it may be admixed to the malt wort prior to evaporation. In all these cases advantage is taken of the vigorous stimulation of the enzymes of the malt by the biochemically important constituents of the vegetable compound used.

As the simplest procedure I recommend that a mixture of the conditioner and diastatic fillers be prepared separately and pretreated in accordance with the formulas given herein. The finished conditioner, including the diastatic materials, is then added to the dough batch just like any other ingredient as e. g. sugar, salt or the like. The conditioner is added at the rate of 1 per cent in proportion to the weight of flour. I have found it most expedient to use flour as the basis for determining the quantity of the other ingredients, following therein the common practice in the art of baking.

I am aware of the fact that many changes may be made in the process and formulas of the present invention without departing from the spirit of the same. Thus, in the foregoing specification I have made particular reference to the manufacture of bread. It should be noted, however, that my invention may equally well be applied to all kinds of dough products and related articles and I do not wish to be understood as limiting myself to the exact ingredients and formulas given herein.

I claim:

1. The method of preparing a dough conditioner increasing the fermentation tolerance of the dough, which method comprises the following steps: preparing a mixture of neutralized organic acids, phytins and ammonium chloride, to form a first mixture, said organic acids being neutralized by means of nitrogen containing yeast assimilable compounds, thereafter mixing said first mixture with materials containing diastatic enzymes to form a second mixture, said second mixture being heated in the presence of water to a point slightly below the damaging point of the amylolytic enzymes, whereby an interaction takes place between the said first mixture and the said diastatic enzymes, increasing the strength of the amylolytic enzymes without producing a corresponding rise in the activity of the proteoclastic enzymes.

2. The method claimed in claim 1, in which, for the supply of the said organic acids and phytins, a phytin containing waste product is used, the latter being selected from the group of phytin-containing waste products consisting of steepwaters from cornstarch factories, presswaters from potato starch factories and spent washes from distilleries.

3. The method claimed in claim 1, in which the material supplying the said organic acids is an extract of vegetable matter, the same being soured for the purpose of forming acids of the type produced in sour dough fermentation.

4. The method claimed in claim 1, in which said materials containing diastatic enzymes consist of a malt mash, the said first mixture being added to the said mash during the processing thereof.

5. The method claimed in claim 1, in which for the supply of the said phytins, infusions of phytin-containing vegetable materials are used.

ALFRED POLLAK.